Oct. 23, 1928.
J. H. HIRSCH ET AL
1,688,333
PROCESS AND APPARATUS FOR MAKING COMPOSITE MATTRESSES
Filed Sept. 23, 1925    3 Sheets-Sheet 1
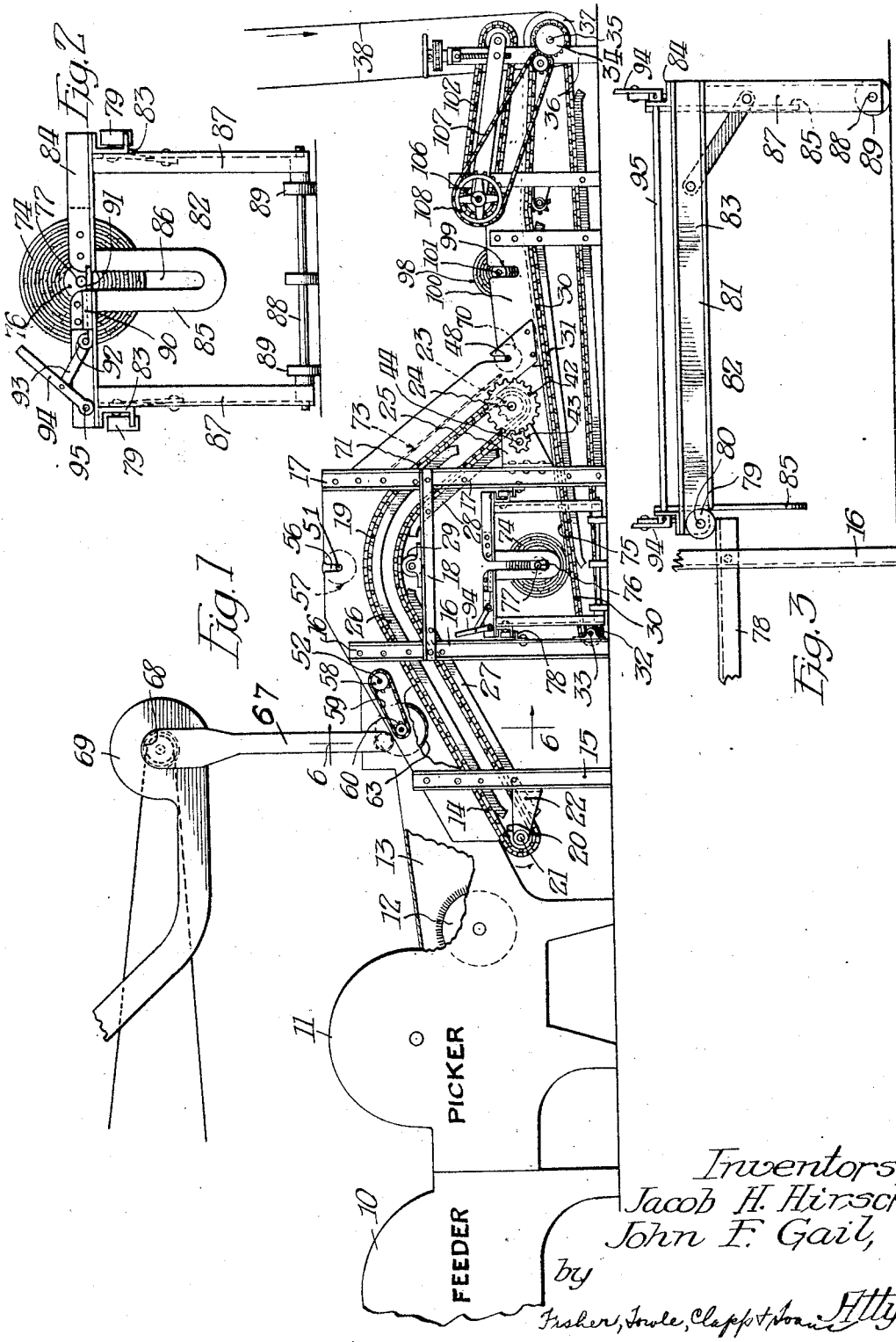
Inventors:
Jacob H. Hirsch,
John F. Gail,
by
Fisher, Fowle, Clapp & Soans Attys Oct. 23, 1928.　　　　　　　　　　　　　　1,688,333
J. H. HIRSCH ET AL
PROCESS AND APPARATUS FOR MAKING COMPOSITE MATTRESSES
Filed Sept. 23, 1925　　　3 Sheets-Sheet 2
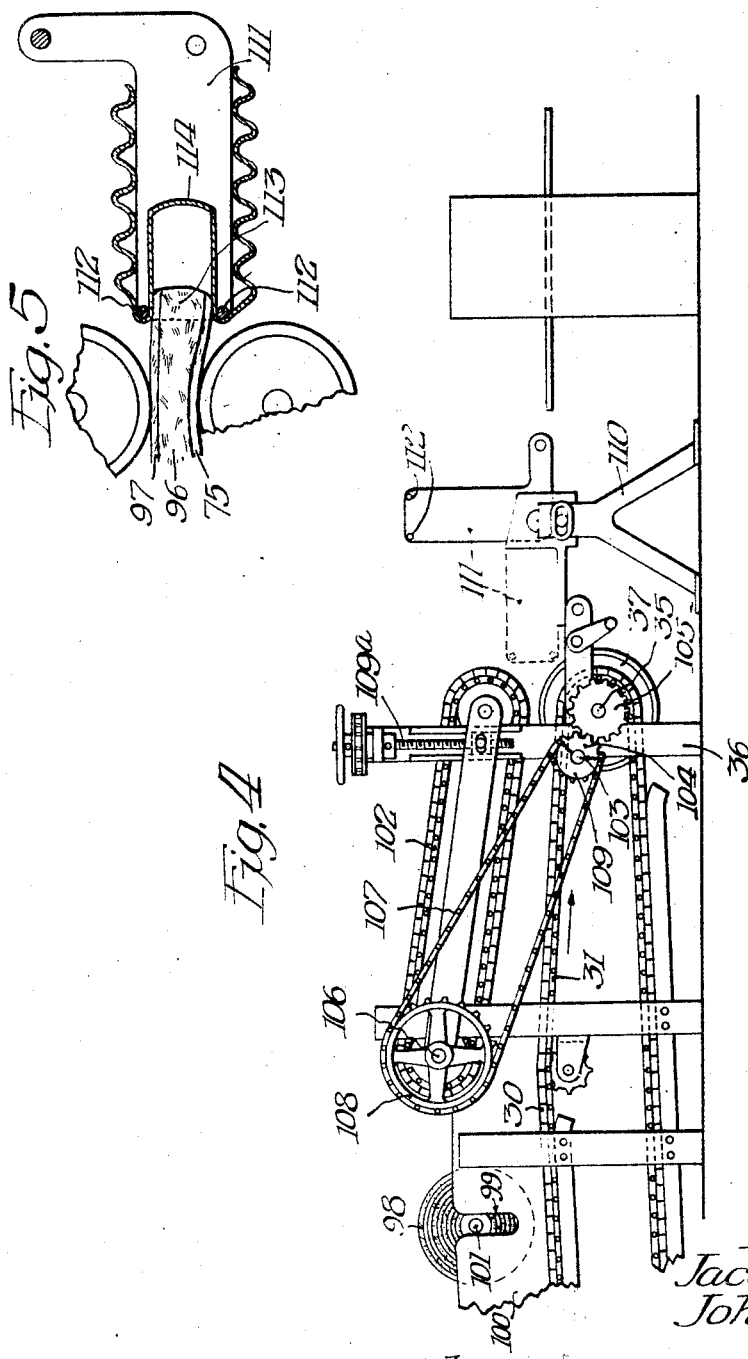
Inventors:
Jacob H. Hirsch,
John F. Gail,
by Fisher, Fowle, Clapp & Roane Attys Oct. 23, 1928.
J. H. HIRSCH ET AL
1,688,333
PROCESS AND APPARATUS FOR MAKING COMPOSITE MATTRESSES
Filed Sept. 23, 1925   3 Sheets-Sheet 3
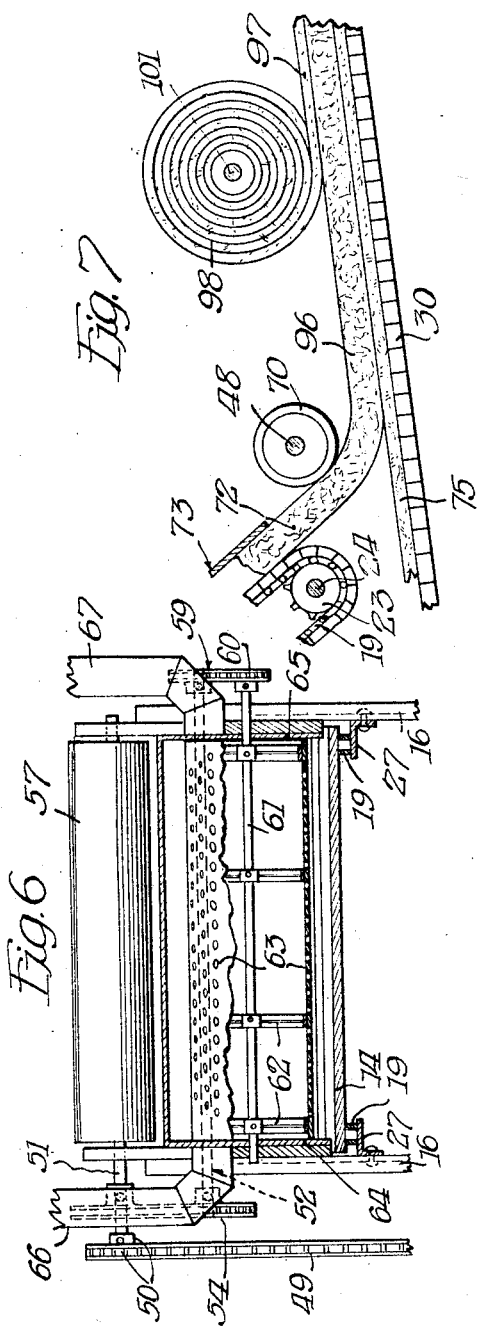
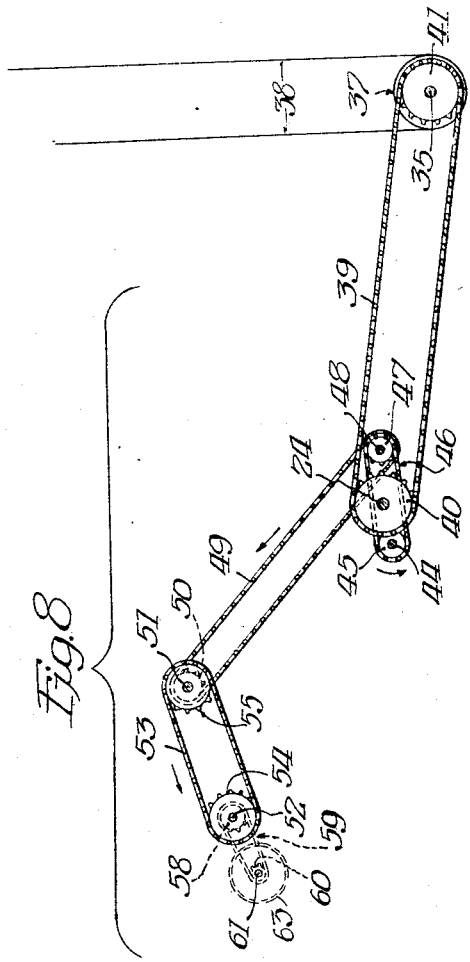
Inventors:
Jacob H. Hirsch,
John F. Gail,
by Fisher, Fowle, Clapp & Soans Attys.

Patented Oct. 23, 1928.

1,688,333

UNITED STATES PATENT OFFICE.

JACOB H. HIRSCH, OF ATLANTA, GEORGIA, AND JOHN F. GAIL, OF EVANSTON, ILLINOIS, ASSIGNORS TO SIMMONS COMPANY, OF NEW YORK, N. Y., A CORPORATION OF DELAWARE.

PROCESS AND APPARATUS FOR MAKING COMPOSITE MATTRESSES.

Application filed September 23, 1925. Serial No. 58,211.

Our invention relates to improvements in process and apparatus for making composite mattresses, and is of especial value in the manufacture of mattresses of the so-called "plater" type.

The objects of the invention are to provide an efficient, economical and practical process of the class described, and to provide a simple, inexpensive, efficient, rugged and high speed apparatus for practicing said process.

In the drawings which illustrate our invention as applied to the manufacture of a three-ply plater mattress,—

Fig. 1 is a side elevation of the organized machine for carrying out the process.

Fig. 2 is a view similar to Fig. 1, but showing only the roll support with certain of its parts in a different position.

Fig. 3 is a side elevation of the parts shown in Fig. 2.

Fig. 4 is an enlargement of the right hand end of Fig. 1 and an extension thereof, showing the filling apparatus.

Fig. 5 is a vertical section through a portion of the filling mechanism.

Fig. 6 is a section taken on the line 6—6 of Fig. 1.

Fig. 7 is an enlargement of a portion of Fig. 1, showing the manner of depositing the various layers, and Fig. 8 is a diagram of certain driving connections.

We will describe the construction and operation of the various elements of the machine, commencing with the raw material. Referring to Fig. 1, 10 represents a machine for feeding short fiber linters, which are conducted to said feeder by a suitable spout or conveyor extending from the bale opening apparatus. The numeral 11 represents a picker apparatus which receives its supply of material from the feeder 10. Said picker 11 is of that type which, in the trade, is usually known as a "Fearnaught" and is equipped with a doffing roll 12, adapted to deliver the picked fibers into the spout chamber 13. The spout or chamber 13 is inclined upwardly as shown in Fig. 1 and, except at the delivery end thereof, is entirely closed. The lower wall or floor of said spout, consists of an upwardly moving conveyor or apron 14, preferably of the slat type as shown.

Said delivery chamber 13 and conveyor 14 are carried by a suitable frame work which includes the posts 15, 16, 17 and cross bar 18. The chains 19 of the conveyor 14 are trained around sprockets 20, mounted on a shaft 21, revolving in bearings of brackets 22, carried by the frame work of the machine and located beneath the delivery chamber 13. The other ends of the chains 19 are trained around sprockets 23, keyed to a shaft 24, supported in the bearings of brackets 25, also secured to the frame work of the machine. The intermediate portions of the chains 19, are guided and supported by arched track members 26, which support the upper stretch or operating surface of the conveyor or apron, while other tracks 27 and 28 and suitable pulleys or idlers 29, support the return stretch of said conveyor.

The conveyor or apron 14 is arranged to deliver its load in an inclined direction, downwardly upon a point intermediate in length of another apron or traveling conveyor 30, which conveyor 30, at its feed end, extends under the space or opening formed by the arch or hump in apron 14. Said apron 30 may be of the usual slot construction as shown, and is actuated and supported by chains 31 which, at one end, are trained around sprockets 32 on shaft 33 and, at the other end, are trained around sprockets 34, keyed to a shaft 35, mounted in bearings on a stationary frame 36.

The shaft 35 is driven by a pulley 37 and belt 38 connected to any suitable source of power. As shown best by Figs. 1 and 8, the shaft 24 which actuates the hump conveyor 14, 19 is driven from the shaft 35 by a chain 39, trained around sprockets 40 and 41 keyed respectively to the shafts 24 and 35.

On the shaft 24, there is keyed a spur gear 42 which meshes with a pinion 43 keyed to a shaft 44, see Fig. 1 and Fig. 8. On said shaft 44, there is also keyed a sprocket wheel 45 which, by means of a sprocket chain 46, drives a sprocket gear 47 keyed to shaft 48. It will be observed that the shaft 48 runs in a direction opposite to the direction of rotation of shafts 35 and 24 which drive the conveyors. On the shaft 48 there is another sprocket gear around which is trained a chain 49, trained around a sprocket gear 50 on shaft 51, and shaft 51 drives shaft 52 through a chain 53 trained around sprocket gears 54 and 55, keyed respectively to the shafts 52 and 51.

The shaft 51 extends across and above the hump of the conveyor 19 and is journaled in slotted bearings 56 on opposite sides of the machine frame. It is also fitted with a light drum or roller 57 which revolves in such direction that its lower periphery will move substantially at the same speed and in the same direction as the upper stretch of the conveyor 14. The shaft 52 is merely a jack shaft which extends across the machine, is journaled in suitable bearings and on the end remote from its driven end, is equipped with a sprocket gear 58 which through a chain 59 drives a sprocket gear 60 keyed to the shaft 61.

The shaft 61 extends across the frame of the machine and is capable of a limited amount of vertical movement therein. To said shaft there are keyed a series of spiders as 62, the peripheries of which support a cylindrical perforated drum 63, which rests upon the surface of the material carried under said drum by the conveyor 14. The drum 63 is open at each end and the ends of same fit rather closely between side plates 64 and 65 carried by or formed as parts of the machine frame, so that there will be substantially no leakage of air or material between the ends of the drum and the sides of the frame. In said plates 64 and 65 there are made, within the circle of the drum 63, a pair of apertures which lead into eduction pipes 66 and 67, said pipes, as shown best in Fig. 1, being connected to the suction openings as at 68 of a constantly driven exhaust fan 69. It will be understood that by means of such suction apparatus and connections, the interior of the drum 63 is maintained under slight vacuum so that air borne or floatant dust within the spout chamber 13 will be drawn out of the machine and will not become a part of the mattress filling. On the shaft 48 there is mounted a drum or roller 70 which is similar to the drum or roller 57 and revolves at the same speed and in the same direction. The purpose of the drums or rollers 56 and 70 which are so adjusted as to bear resiliently upon the filler layer carried by the conveyor 14, 19, is such that there will be no, or substantially no tendency for the rather incoherent layer of filling material to break, pull apart, or slide down the downwardly inclined stretch 71 of the apron 14. Also, in order still further to insure against damage to the layer 72 of filling material, we may provide a fixed guard or pressure element which takes the form of a sheet or plate 73 extending across and above the inclined portion 71 of the conveyor 14, and so spaced from the latter that the upper surface of the filler layer 72 will slide down in contact with said guard plate 73.

The arch or hump in the conveyor 14 is for the purpose of providing space between said conveyor and the receiving end of the lower conveyor or apron 30. Said space permits room for and allows the manipulation of a felt roll 74 from which a layer 75 of coherent felted fiber is delivered to the upper surface of the lower conveyor 30. Said felt roll 74 is formed on a roller 76 on shaft 77 and is prepared in advance by means of the usual Garnett machine.

Special means are provided for placing and positioning the roll 74 and for permitting it to unroll freely without the application of power and as the apron 31 advances. By reference to Figs. 1, 2, and 3, it will be seen that on the uprights 16 and 17, there are secured horizontal and parallel tracks 78, which tracks accommodate small rollers 79 mounted on pins 80, extending laterally from the inner corners of the frame 81 of a trolley designated as a whole 82. Said side members 81 comprise channels as at 83 across the ends of which are hung or connected looped bars or end pieces 84. The loops 85 of said end pieces constitute in effect, guides having slots 86 of sufficient width and depth to accommodate the ends of the shaft 77 at all positions of the latter shaft.

The rollers 79 support the inner corners of the trolley 82 and the outer ends of said trolley are supported by suitably braced legs 87, the lower ends of which are fitted with a horizontal shaft or axle 88 on which are mounted wheels or rollers 89. On the end pieces 84, we prefer to fit or secure small sockets 90 in which slide pins 91 of sufficient length to bridge the open ends of the slots 86 when said plungers 91 are fully advanced. Said plungers 91 also are made with eyes or loops 92 at their outer ends which accommodate pins on links 93. The links 93 are pivoted to a pair of small levers 94 keyed to the outer ends of a horizontal transverse shaft 95 journaled in small brackets carried by one of the side bars 81.

When a roll of felt 74 is to be placed in the machine, the trolley 82 is pulled out from under the machine into the position indicated in Fig. 3. The plungers 91 are then fully advanced by moving the levers 94 into the position as shown in Fig. 2 and the roll of felt 74 is positioned on the trolley with the projecting ends of the shaft 77 resting upon the plungers 91, at that time extending across the open upper ends of the slots 86 in the end pieces 84. The trolley with the roll 74 so suspended is then pushed into the machine under the hump of the conveyor 19 and when it is in the proper location, the roll 74 is dropped onto the apron 31 by throwing back the levers 94 and withdrawing the plungers or latches 91. The machine is then started and the conveyor 31 will automatically unroll the layer of felt from the roll or bat 72 and carry the end of it under the delivery end of the conveyor 14, as shown in Fig. 7.

As it is desirable to sheath or plate both sides of the mattress filler with a coherent layer of felted material, we apply to the upper side or surface of the filler layer or body 96 an upper layer of felt 97, as shown in Fig. 7. Since the delivery end of the apron 31 is exposed and is not overlaid by any other conveyor, we do not find it necessary to provide a special trolley for handling the felt roll 98 from which the upper felt layer 97 is supplied. It is merely necessary to form suitable slots 99 in the sides 100 of the conveyor chute so as to accommodate the projecting ends of the shaft 101 on which the felt pad or roll 98 is wound. As in the case of the roll or pad 74, it is not necessary to apply power to the shaft 101 as the movement of the conveyor 31 upon which the roll 98 rests, is sufficient to cause the layer 97 to unroll with sufficient freedom.

In Figs. 4 and 5 we have illustrated a form of tick filling apparatus which resembles in some respects, the well known Beale filler. This comprises an endless apron 102 disposed above the delivery end of the apron 30 and driven in a direction opposite to the direction of movement of chain conveyor 30. As shown best in Fig. 4, there is a jack shaft 103 driven by spur gears 104 and 105 keyed respectively to shafts 103 and 35. The shaft 103 drives the shaft 106 of the conveyor 102 by means of a chain 107 trained around sprocket gears 108 and 109, keyed respectively to said shafts 106 and 103. A suitable adjusting device 109ª is employed for the purpose of bringing the outer end or delivery end of the conveyor 102 closer or farther away from the delivery end of the apron 30, the space between said conveyors preferably converging towards the delivery end as shown in Fig. 4.

The tick which is to be filled, is turned inside out and slipped over a hollow skeleton frame, rockingly mounted on a pair of standards 110. Said frame comprises end plates 111 joined or connected transversely of the machine by means of a pair of rods 112 between which the mattress body is forced by the propelling aprons 30 and 102. As the mattress body 113 is forced outwardly and between the rods 112, the tick 114 is gradually filled and drawn off its support in a manner well known to those skilled in the art. As the tick is filled, it gradually assumes its proper right side out condition and when sufficiently full, the machine is stopped and the continuous mattress body is severed or broken off by hand. The open end of the tick is then sewed up in the usual manner and the mattress is tufted and otherwise completed according to the regular practice.

The described details of construction and operation being merely illustrative of one phase of our invention, it will be understood that the scope of same should be determined by the appended claims, said claims being construed as broadly as possible consistent with the state of the art.

We claim as our invention:

1. Apparatus for making composite mattresses, comprising a lower travelling apron for supporting and propelling a layer of felted fiber, and an upper travelling apron arranged to deliver a continuous body of filling material upon the surface of the felted fiber layer, carried by said lower apron, and at a point intermediate of the length of said lower apron, said aprons, rearwardly of said delivery point, being spaced apart a sufficient distance to accommodate a roll which serves as a supply source for said under layer.

2. Apparatus for making composite mattresses, comprising a generally horizontal apron for supporting a felt layer, an inclined apron directed downwardly towards the upward surface of the first apron, and arranged to deliver a continuous body of filling material onto the upper surface of the felt layer carried by said first apron, and means for actuating said aprons in unison.

3. Apparatus for making composite mattresses comprising a travelling apron for receiving and propelling a layer of coherent felted fibrous material, means for supporting a roll of such felted material and depositing the same on said travelling apron, means for forming and depositing a layer of incoherent fibrous filling material on the exposed surface of said layer of felted material while the latter is propelled by said apron, and means for continuously depositing a second layer of felted fibrous material on the exposed surface of said layer of filling material while the latter is propelled with the first layer of felted material.

4. Apparatus for making composite mattresses, comprising a travelling apron for receiving and propelling a layer of coherent felted fibrous material, means for supporting a roll of such felted material and depositing the same on said traveling apron, a second travelling apron for propelling a layer of incoherent fibrous filling material and continuously depositing the same on said layer of felted material while the latter is propelled, means for maintaining the layer of incoherent material in layer form and in contact with its apron while the latter is traveling and until the layer of incoherent material is deposited on said layer of felted material, and means for continuously depositing a second layer of felted fibrous material on the exposed surface of said layer of filling material after the latter is deposited on said first mentioned layer of felted material.

JOHN F. GAIL.
JACOB H. HIRSCH.